United States Patent
Gao et al.

(10) Patent No.: US 8,519,064 B2
(45) Date of Patent: Aug. 27, 2013

(54) ENCAPSULATED MATERIAL COMPOSITION

(75) Inventors: Reui Hong Gao, Taipei (TW); Mao Ping Lee, Taipei (TW); Juei Kuo Wu, Taipei County (TW); Jui Jung Wu, Taipei County (TW)

(73) Assignee: Indial Technology Co., Ltd, Shulin, Taipei County (TW)

( * ) Notice: Subject to any disclaimer, the term of this patent is extended or adjusted under 35 U.S.C. 154(b) by 84 days.

(21) Appl. No.: 12/900,631

(22) Filed: Oct. 8, 2010

(65) Prior Publication Data

US 2011/0098407 A1    Apr. 28, 2011

(30) Foreign Application Priority Data

Oct. 28, 2009    (TW) ................................. 98136587 A

(51) Int. Cl.
*C08G 77/20* (2006.01)
*C08G 77/14* (2006.01)

(52) U.S. Cl.
USPC ............................. 525/478; 525/474; 525/477

(58) Field of Classification Search
USPC ........................................ 525/478, 474, 477
See application file for complete search history.

(56) References Cited

U.S. PATENT DOCUMENTS

| | | | | |
|---|---|---|---|---|
| 3,249,581 A | * | 5/1966 | Nelson | 524/861 |
| 3,350,337 A | * | 10/1967 | Campbell | 524/269 |
| 3,461,185 A | * | 8/1969 | Brown | 525/478 |
| 3,532,649 A | * | 10/1970 | Snedeker et al. | 525/478 |
| 5,017,221 A | * | 5/1991 | Legrow et al. | 106/2 |
| 5,077,249 A | | 12/1991 | Lee et al. | |
| 5,240,760 A | * | 8/1993 | George et al. | 428/145 |
| 5,279,898 A | | 1/1994 | Evans et al. | |

(Continued)

FOREIGN PATENT DOCUMENTS

| | | |
|---|---|---|
| CN | 101389695 A | 3/2009 |
| CN | 101466795 A | 6/2009 |

OTHER PUBLICATIONS

Tomanek, Andreas. Silicones and Industry: A compendium for practical use, instruction and reference. Evidentiary reference.*

*Primary Examiner* — Mike M Dollinger
(74) *Attorney, Agent, or Firm* — Morris Manning & Martin LLP; Tim Tingkang Xia, Esq.

(57) ABSTRACT

An encapsulated material composition is presented, which contains a compound of Chemical Formula I and a compound of Chemical Formula II, Chemical Formula I

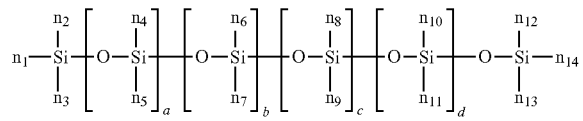

Chemical Formula II

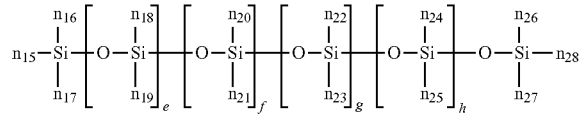

and has high refractive index due to the cycloalkane structure in the compound of Chemical Formula I and the compound of Chemical Formula II. Therefore, when the encapsulated material composition is applied in the light emitting diode (LCD) encapsulated structure, the light extraction efficiency of the LED encapsulated structure is effectively enhanced.

15 Claims, 1 Drawing Sheet

U.S. PATENT DOCUMENTS

| | | |
|---|---|---|
| 5,516,870 A | 5/1996 | Biggs et al. |
| 5,554,708 A | 9/1996 | Biggs et al. |
| 5,578,692 A | 11/1996 | Biggs et al. |
| 5,616,672 A * | 4/1997 | O'Brien et al. ............... 528/15 |
| 6,101,636 A * | 8/2000 | Williams ...................... 2/410 |
| 2006/0094834 A1* | 5/2006 | Aoki et al. ................... 525/478 |

* cited by examiner

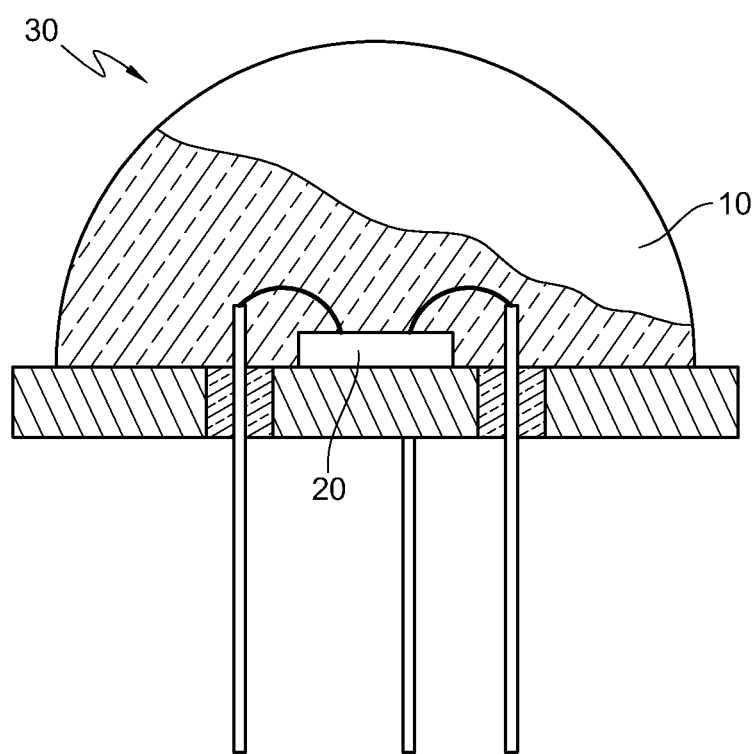

ENCAPSULATED MATERIAL COMPOSITION

CROSS-REFERENCE TO RELATED APPLICATIONS

This non-provisional application claims priority under 35 U.S.C. §119(a) on Patent Application No(s). 098136587 filed in Taiwan, R.O.C. on Oct. 28, 2009, the entire contents of which are hereby incorporated by reference.

BACKGROUND OF THE INVENTION

1. Field of the Invention

The present invention relates to an encapsulated material, and particularly to an encapsulated material composition.

2. Related Art

In recent years, with the development of electronic technology and rising of environment protection awareness, environment concepts, such as energy saving and carbon reduction have been introduced in development and design of the majority of electronic products presently. Due to the advantages of energy saving (power save), low volume, long lifespan (about 100 thousands hours), and high response rate (about 1000 seconds), the application fields of light emitting diode (in short LED) has broadened from the earlier indicator light to the current wide application in back light source of liquid crystal screen, large display, head light and various illumination devices. Furthermore, the requirements for high-brightness LEDs are increasing daily.

Generally, LEDs are mostly disposed in electronic devices in the form of encapsulated structure. The LED encapsulated structure is mainly encapsulated around a LED chip with a transparent encapsulated material as a protective layer of the LED chip to serve as a protection layer of the LED chip. The light emitted by LED chip will undergo a series processes, such as optical diffuse, reflection, or light wavelength conversion in the encapsulated material, and finally penetrate the encapsulated material and emitted into atmosphere. Therefore, the overall light emitting efficiency of the LED encapsulated structure will be affected by the LED chip, the encapsulated form, and the encapsulated material.

With the advance in epitaxial technology, the light emitting efficiency of LED chip can be above 90% presently. However, due to the excessively high refractive index (in short RI) difference between the LED chip and the encapsulated material, the light emitted from LED chip will be totally reflected when passing through the encapsulated material, for example, in the blue LED encapsulated structure, the material of the blue LED chip is gallium nitride (GaN) with a refractive index of 2.4, and the encapsulated material is silicon gel or epoxy resin with a refractive index ranging from 1.4 to 1.5. Thus, when being transmitted to the interface between the blue LED chip and the encapsulated material, the majority of the light emitted from the blue light diode chip is totally reflected internally back to the chip, due to the high refractive index difference between the blue diode chip (RI=2.4) and the encapsulated material (RI=1.4-1.5), such that the light extraction efficiency of the LED encapsulated structure is significantly reduced to about 30%.

Therefore, in the development of LED encapsulated structure, how to reduce the refractive index difference between the LED chip and the encapsulated material to enhance the light extraction efficiency of LED encapsulated structure becomes one of the problems in urgent need of solution.

SUMMARY OF THE INVENTION

The present invention is directed to a encapsulated material composition, to solve the problem in LED encapsulated structure in prior art of low light extraction efficiency of LED encapsulated structure caused by an excessively high difference between the refractive indexes of the used encapsulated material and LED chip.

The present invention provides a encapsulated material composition, containing a compound of Chemical Formula I and a compound of Chemical Formula II below:

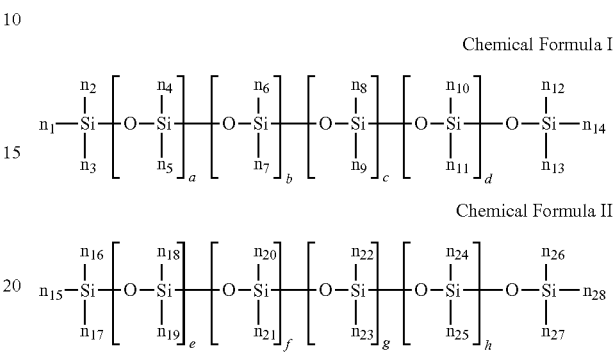

in which, in Chemical Formula I, $n_1$ to $n_{14}$ can be $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, aromatic hydrocarbonyl, and a siliconized functional group thereof, the proportions of a, b, c and d add up to 100%, and the individual proportion of a, b, c and d is no more than 95%; in Chemical Formula II, $n_{15}$ to $n_{28}$ can be $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, 1,2-epoxycycloalkyl, aromatic hydrocarbonyl, hydrogen, and a siliconized functional group thereof, the proportions of e, f, g and h add up to 100%, and the individual proportion of e, f, g and h is no more than 95%.

The encapsulated material composition of the present invention has a good refractive index (above 1.6) due to the cycloalkane structure in the compound of Chemical Formula I and the compound of Chemical Formula II. Therefore, the refractive index difference between the encapsulated material and LED chip is reduced by means of increase of the refractive index of the encapsulated material, such that the light extraction efficiency of LED encapsulated structure can be efficiently improved.

BRIEF DESCRIPTION OF THE DRAWINGS

The present invention will become more fully understood from the detailed description given herein below for illustration only, and thus are not limitative of the present invention, and wherein:

FIG. 1 is a schematic view of a LED encapsulated structure according to an embodiment of the present invention.

DETAILED DESCRIPTION OF THE INVENTION

A encapsulated material composition 10 according to an embodiment of the present invention is applied in a encapsulated structure 30 of a LED 20 (as shown in FIG. 1), the encapsulated material composition 10 contains a compound of Chemical Formula I and a compound of Chemical Formula II:

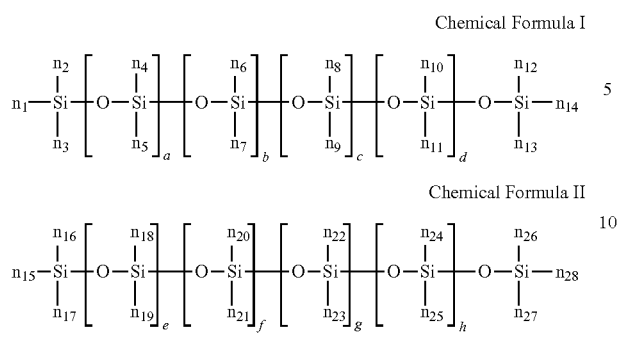

Chemical Formula I

Chemical Formula II in which, in the Chemical Formula I, $n_1$ to $n_{14}$ can be $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, aromatic hydrocarbonyl, and a siliconized functional group thereof, in which at least one of $n_1$ to $n_{14}$ is $C_{2-18}$ alkenyl, the proportions of a, b, c and d add up to 100%, and the individual proportion of a, b, c and d is no more than 95%. The Chemical Formula I has characteristics of a refractive index of above 1.62, a light transmission of 98%, a viscosity of 3000 cps, and a molecular weight (Mn) between 1000~3000. In the Chemical Formula II, $n_{15}$ to $n_{28}$ are one selected from the group consisting of $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, 1,2-epoxy-cycloalkyl, aromatic hydrocarbonyl, hydrogen, and a siliconized functional group thereof, in which at least one of $n_{15}$ to $n_{28}$ is hydrogen, the proportions of e, f, g and h add up to 100%, and the individual proportion of e, f, g and h is no more than 95%. The Chemical Formula II has characteristics of a refractive index of above 1.62, a light transmission of 97%, a viscosity of 4000 cps, and a Mn between 2000~4000.

For preparing the encapsulated material composition according to an embodiment of the present invention, a monomer compound is first prepared following Reaction Scheme I below:

Reaction Scheme I:

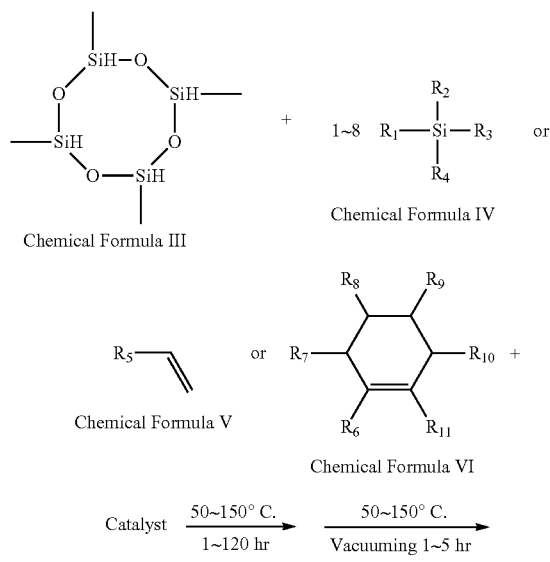

in which a compound of Chemical Formula III is reacted with 1-8 folds of alkenylated silicane (Chemical Formula IV) or an alkene (Chemical Formula V or VI), in which, $R_1$-$R_4$ in Chemical Formula IV can be $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, or aromatic hydrocarbonyl, and at least one of $R_1$-$R_4$ is alkenyl or cycloalkenyl; and $R_5$ in Chemical Formula V can be $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, 1,2-epoxy-cycloalkyl, or aromatic hydrocarbonyl; and $R_6$-$R_{11}$ in Chemical Formula VI can be hydrogen, $C_{1-18}$ alkyl, $C_{4-18}$ cycloalkyl, $C_{2-18}$ alkenyl, $C_{1-18}$ alkoxy, $C_{4-18}$ cycloalkyloxy, or aromatic hydrocarbonyl.

Meanwhile, a catalyst is added to facilitate the reaction, and includes platinum based catalyst, for example, platinum (Pt), chloroplatinic acid, Karstedt catalyst [$Pt_2(Me_2(CH=CH_2)Si_2O)_3$], and polystyrene-supported $K_2PtCl_4$; rhodium catalyst, for example, Wilkinson catalyst; ruthenium catalyst, for example, $RuHCl(CO)(PPh_3)$; palladium catalyst; iridium catalyst; osmium catalyst, for example, $H_2OsCl_6 \cdot 6H_2O$; iron catalyst, for example, $Fe(CO)_5$; cobalt catalyst, for example, $CO_2(CO)_8$ and $CoH(CO)_6$; nickel catalyst; gold catalyst; and photo catalyst. Then, after 1-120 hours reaction at 50-150° C., vacuuming is performed for 1-5 hours at 50-150° C., to complete the preparation of the monomer compound of Chemical Formula VII. In the monomer compound of Chemical Formula VII, m can be, for example, hydrogen, $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy or aromatic hydrocarbonyl, and the configuration of m depends on the species of the used alkenylated silicane or alkene. For example, a monomer compound is formed following Reaction Scheme II below:

Reaction Scheme II:

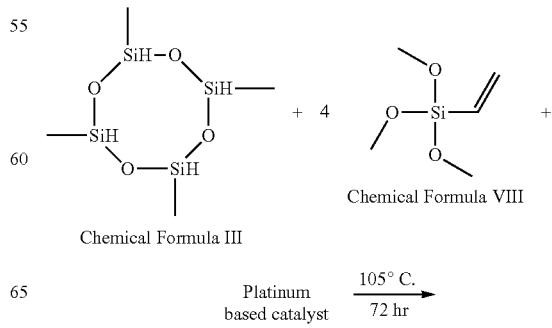

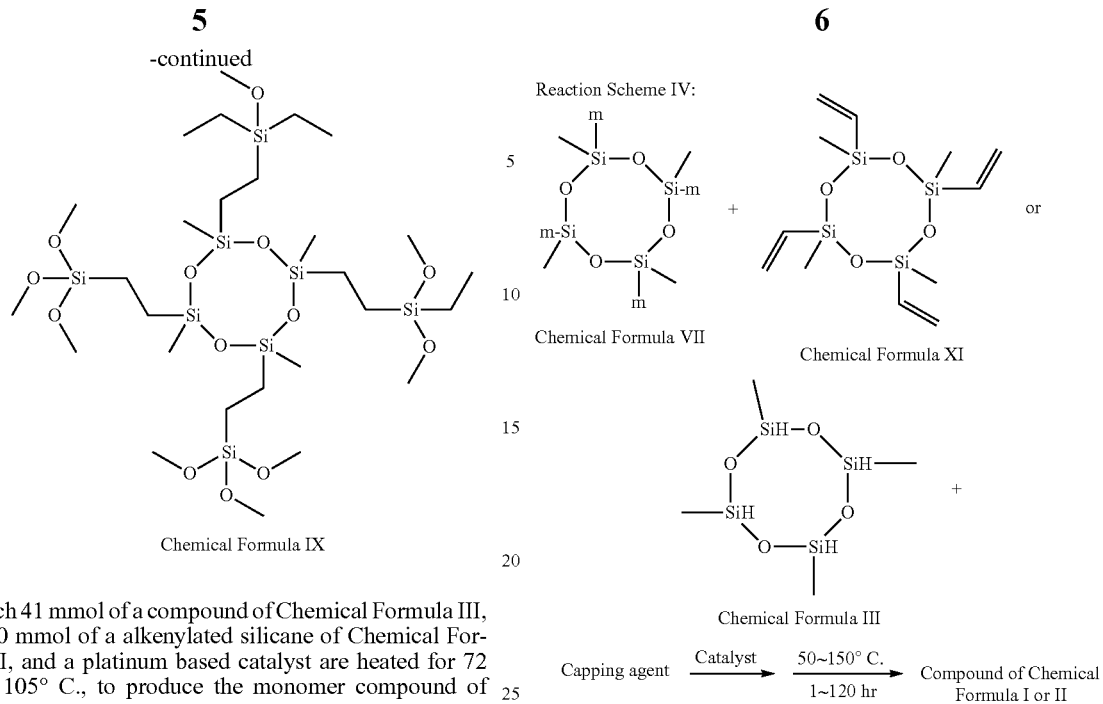

Chemical Formula IX in which 41 mmol of a compound of Chemical Formula III, about 170 mmol of a alkenylated silicane of Chemical Formula VIII, and a platinum based catalyst are heated for 72 hours at 105° C., to produce the monomer compound of Chemical Formula IX; or a monomer compound is formed following Reaction Scheme III below:

Reaction Scheme III:

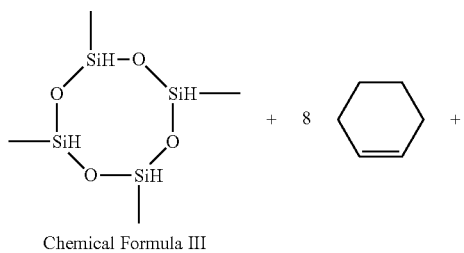

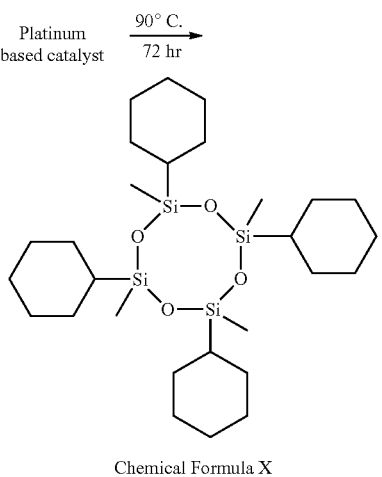

Chemical Formula X in which about 0.208 mol of the compound of Chemical Formula III, about 1.248 mol of cyclohexene, and a platinum based catalyst are heated for 72 hours at 90° C., to produce the monomer compound of Chemical Formula X.

Following the preparation of the monomer compound, the compound of Chemical Formula I and the compound of Chemical Formula II are prepared following Reaction Scheme IV:

Reaction Scheme IV:

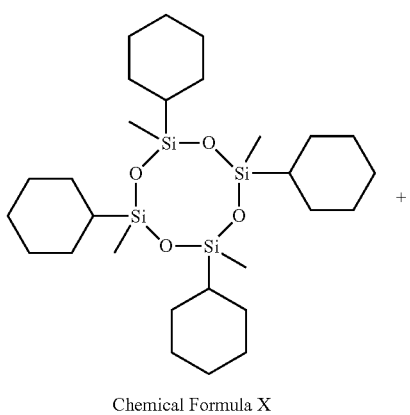

in which the monomer compound of Chemical Formula VII respectively is reacted with the compound of Chemical Formula XI and the compound of Chemical Formula III for 1-120 hours at 50-150° C. in the presence of a capping agent and an optional catalyst, to produce the compound of Chemical Formula I or the compound of Chemical Formula II. The capping agent can be methyldiethanolamine (MDEA), dimethylethanolamine (DMEA), triethylenetetramine (TETA), tetramethyldihydrodisiloxane, tetramethyldivinyldisiloxane, or hexamethyldisiloxane (HMDS), and the catalyst can be, for example, a platinum based catalyst, such as platinum (Pt), and palladium (Pd).

In this embodiment, the preparation of the compound of Chemical Formula I and the compound of Chemical Formula II from the monomer compound of Chemical Formula X is described as example, but the present invention does not limited thereto. When the compound of Chemical Formula I is prepared from the monomer compound of Chemical Formula X, the reaction is as shown in Reaction Scheme V:

Reaction Scheme V:

Chemical Formula X

-continued

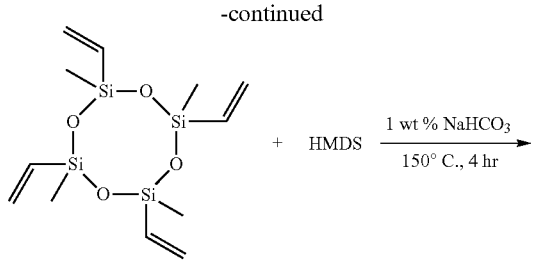

Chemical Formula XI

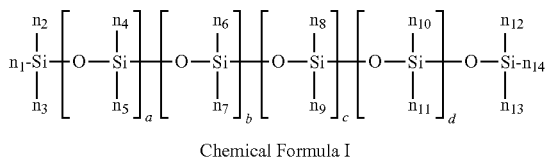

Chemical Formula I in which, 50 mmol of the monomer compound of Chemical Formula X, 5 mmol of the compound of Chemical Formula XI, and 0.348 mmol of hexamethyldisiloxane are reacted for 4 hours at 150° C. in the presence of about 1 wt % of NaHCO$_3$, to produce the compound of Chemical Formula I. Furthermore, when the compound of Chemical Formula II is prepared from the monomer compound of Chemical Formula X, the reaction is as shown in Reaction Scheme VI:

Reaction Scheme VI:

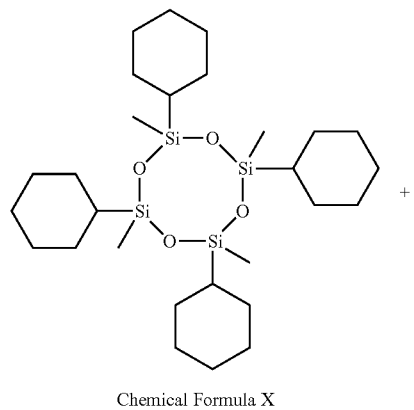

Chemical Formula X

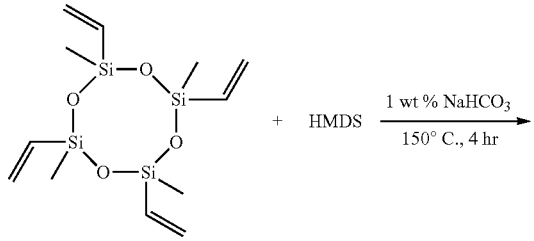

Chemical Formula XI

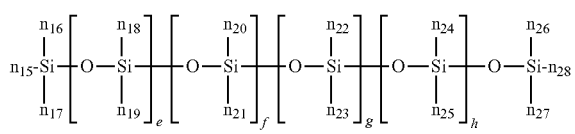

Chemical Formula II in which, 50 mmol of the monomer compound of Chemical Formula X, 5 mmol of the compound of Chemical Formula III, and 0.348 mmol of hexamethyldisiloxane (HMDS) are reacted for 4 hours at 150° C. in the presence of about 1 wt % of acetic acid (CH$_3$COOH), to produce the compound of Chemical Formula II.

Finally, the compound of Chemical Formula I and the compound of Chemical Formula II are mixed at an appropriate ratio, to complete the preparation of the encapsulated material composition. In the process, a platinum based catalyst (e.g., CAT500) can be optionally doped in the compound of Chemical Formula I first, to form a pre-mixture, then the pre-mixture is mixed with the compound of Chemical Formula II at a ration of 1:1, 1:2, 2:1 or other ratios, to form a encapsulated material composition. Due to the cycloalkane structure in the encapsulated material composition, the refractive index of the encapsulated material composition is increased, such that the encapsulated material composition can have a refractive index of above 1.6. In this embodiment, the encapsulated material composition has a refractive index of above 1.62, a light transmission of 97% and a hardness of shore D 50.

The present invention provides a encapsulated material composition, which contains the compounds of Chemical Formulas I and II:

Chemical Formula I

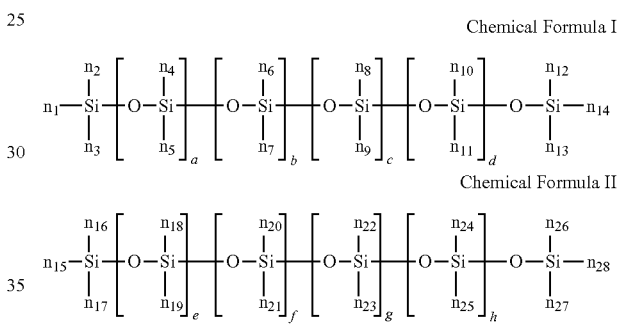

Chemical Formula II and has a refractive index of above 1.6 due to the cycloalkane structure in the compounds of Chemical Formulas I and II. Therefore, when the encapsulated material composition is applied in a LED encapsulated structure, the refractive index difference between the encapsulated material composition and a LED chip can efficiently reduced, thereby the light extraction efficiency of the LED encapsulated structure is enhanced.

What is claimed is:
1. An encapsulated material composition, comprising:
a compound of Chemical Formula I and a compound of Chemical Formula II different from the Chemical Formula I below:

Chemical Formula I

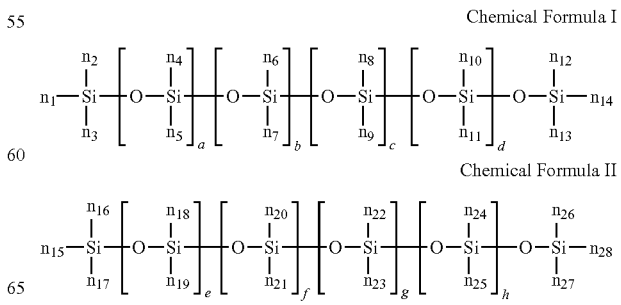

Chemical Formula II wherein the compound of Chemical Formula I is formed by reacting a compound of Chemical Formula X, a compound of Chemical Formula XI, and a first capping agent, and a molar ratio of the compound of Chemical Formula X to the compound of Chemical Formula XI is 10:1; and Chemical Formula X

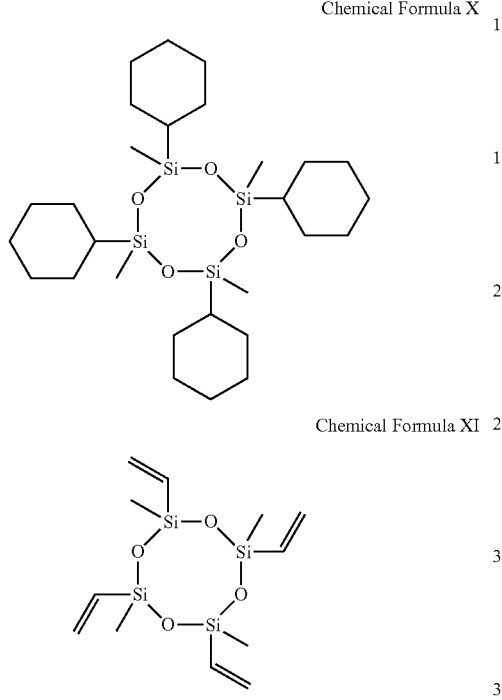

Chemical Formula XI wherein in the Chemical Formula I, at least one of $n_1$ to $n_{14}$ is cycloalkane structure, and the rest of $n_1$ to $n_{14}$ are one selected from the group consisting of $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, aromatic hydrocarbonyl, and a siliconized functional group thereof, the proportions of a, b, c and d add up to 100%, and the individual proportion of a, b, c and d is no more than 95%, and a molecular weight of the Chemical Formula I is between 1000~3000; in the Chemical Formula II, at least one of $n_{15}$ to $n_{28}$ is cycloalkane structure, and the rest of $n_{15}$ to $n_{28}$ are one selected from the group consisting of $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, 1,2-epoxy-cycloalkyl, aromatic hydrocarbonyl, hydrogen, and a siliconized functional group thereof, the proportions of e, f, g and h add up to 100%, and the individual proportion of e, f, g and h is no more than 95%, and a molecular weight of the Chemical Formula II is between 2000~4000.

2. The encapsulated material composition according to claim 1, wherein at least one of $n_{15}$ to $n_{28}$ is hydrogen.

3. The encapsulated material composition according to claim 1, further comprising a catalyst.

4. The encapsulated material composition according to claim 3, wherein the catalyst is mixed in the compound of Chemical Formula I.

5. The encapsulated material composition according to claim 1, wherein the compound of Chemical Formula II is formed by reacting a plurality of monomer compounds of Chemical Formula VII with a second capping agent;

Chemical Formula VII

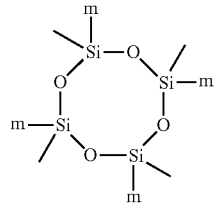

wherein, m is one selected from the group consisting of hydrogen, $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, and aromatic hydrocarbonyl.

6. The encapsulated material composition according to claim 5, wherein at least one of the first capping agent and the second capping agent is selected from the group consisting of methyldiethanolamine (MDEA), dimethylethanolamine (DMEA), triethylenetetramine (TETA), tetramethyldihydrodisiloxane (TMDS), tetramethyldivinyldisiloxane (TMDVDS), and hexamethyldisiloxane (HMDS).

7. The encapsulated material composition according to claim 5, wherein the monomer compound of Chemical Formula VII is formed by reacting a compound of Chemical Formula III with an alkenylated silane or an alkene Chemical Formula III

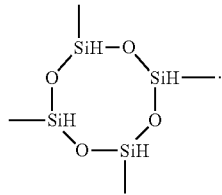

8. The encapsulated material composition according to claim 7, wherein the alkene is an alkene of Chemical Formula VI:

Chemical Formula VI

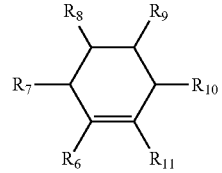

wherein $R_6$-$R_{11}$ are one selected from the group consisting of hydrogen, $C_{1-18}$ alkyl, $C_{4-18}$ cycloalkyl, $C_{2-18}$ alkenyl, $C_{1-18}$ alkoxy, $C_{4-18}$ cycloalkyloxy, and aromatic hydrocarbonyl.

9. An encapsulated material composition, comprising:
a compound of Chemical Formula I and a compound of Chemical Formula II different from the Chemical Formula I below:

Chemical Formula I

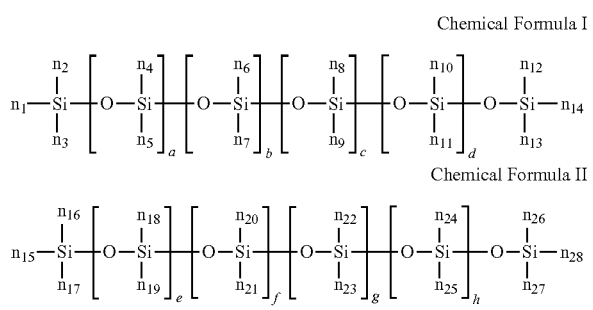

Chemical Formula II wherein the compound of Chemical Formula II is formed by reacting a compound of Chemical Formula X, a compound of Chemical Formula III, and a first capping agent, and a molar ratio of the compound of Chemical Formula X to the compound of Chemical Formula III is 10:1; and Chemical Formula X

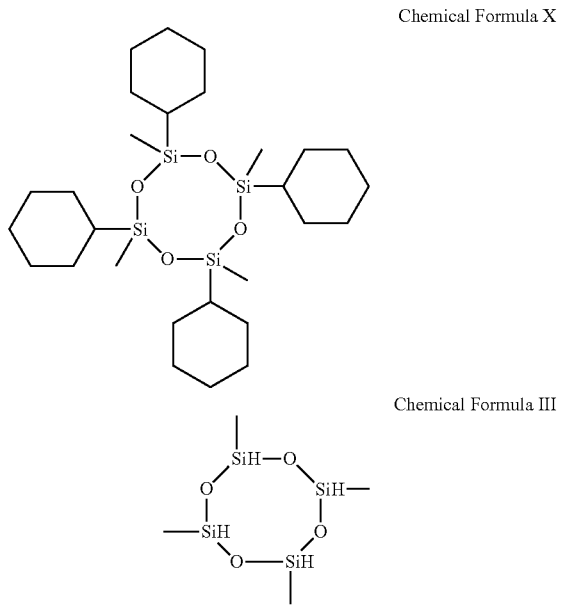

Chemical Formula III

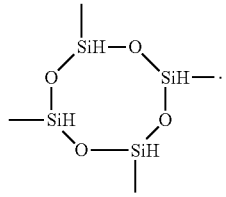

wherein in the Chemical Formula I, at least one of $n_1$ to $n_{14}$ is cycloalkane structure, and the rest of $n_1$ to $n_{14}$ are one selected from the group consisting of $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, aromatic hydrocarbonyl, and a siliconized functional group thereof, the proportions of a, b, c and d add up to 100%, and the individual proportion of a, b, c and d is no more than 95%, and a molecular weight of the Chemical Formula I is between 1000~3000; in the Chemical Formula II, at least one of $n_{15}$ to $n_{28}$ is cycloalkane structure, and the rest of $n_{15}$ to $n_{28}$ are one selected from the group consisting of $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, 1,2-epoxy-cycloalkyl, aromatic hydrocarbonyl, hydrogen, and a siliconized functional group thereof, the proportions of e, f, g and h add up to 100%, and the individual proportion of e, f, g and h is no more than 95%, and a molecular weight of the Chemical Formula II is between 2000~4000.

10. The encapsulated material composition according to claim 9, wherein at least one of $n_1$ to $n_{14}$ is alkenyl or cycloalkenyl.

11. The encapsulated material composition according to claim 9, further comprising a catalyst mixed in the compound of Chemical Formula I.

12. The encapsulated material composition according to claim 9, wherein the compound of Chemical Formula I is formed by reacting a plurality of monomer compounds of Chemical Formula VII with a second capping agent;

Chemical Formula VII

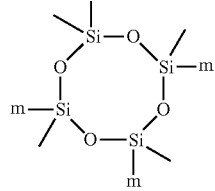

wherein, m is one selected from the group consisting of hydrogen, $C_{1-18}$ alkyl, $C_{4-18}$ cycloalkyl, $C_{2-18}$ alkenyl, $C_{4-18}$ cycloalkenyl, $C_{1-18}$ alkoxy, $C_{4-18}$ cycloalkyloxy, and aromatic hydrocarbonyl.

13. The encapsulated material composition according to claim 12, wherein at least one of the first capping agent and the second capping agent is selected from the group consisting of methyldiethanolamine (MDEA), dimethylethanolamine (DMEA), triethylenetetramine (TETA), tetramethyldihydrodisiloxane (TMDS), tetramethyldivinyldisiloxane (TMDVDS), and hexamethyldisiloxane (HMDS).

14. The encapsulated material composition according to claim 12, wherein the monomer compound of Chemical Formula VII is formed by reacting a compound of Chemical Formula III with an alkenylated silane or an alkene, Chemical Formula III

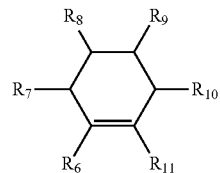

15. The encapsulated material composition according to claim 14, wherein the alkene is an alkene of Chemical Formula VI:

Chemical Formula VI wherein $R_6$-$R_{11}$ are one selected from the group consisting of hydrogen, $C_{1-18}$ alkyl, $C_{4-18}$ cycloalkyl, $C_{2-18}$ alkenyl, $C_{1-18}$ alkoxy, $C_{4-18}$ cycloalkyloxy, and aromatic hydrocarbonyl.

* * * * *